Jan. 22, 1929.　　　　J. BLACKBURN　　　1,699,830

CABLE CLAMP

Filed Feb. 13, 1928

INVENTOR
Jasper Blackburn
By Edward E. Lugan
ATTY.

Patented Jan. 22, 1929.

1,699,830

UNITED STATES PATENT OFFICE.

JASPER BLACKBURN, OF WEBSTER GROVES, MISSOURI.

CABLE CLAMP.

Application filed February 13, 1928. Serial No. 253,843.

My invention relates to improvements in cable clamps, and has for its primary object a two-piece cable clamp which can be attached directly to a screw threaded rod thereby eliminating the extra cost of forming an eye on the end of the rod and also the use of thimbles.

A further object is to construct a cable clamp in which a sheave wheel is provided around which a portion of the cable passes so that when the cable or guy wire is tightened up it will readily pass around the wheel.

A still further object is to construct a cable clamp formed of two pieces or sections and in which the top section is so constructed and arranged that a certain amount of the strain set up by a cable or guy wire passing around the sheath wheel carried by the lower section is imparted and absorbed by the upper section.

Figure 1:
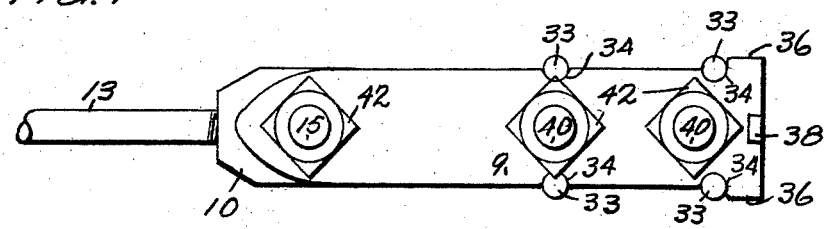
Fig. 1 is a top plan view of my device with a portion of an earth anchor rod or similar attaching means connected thereto.
Figure 2:
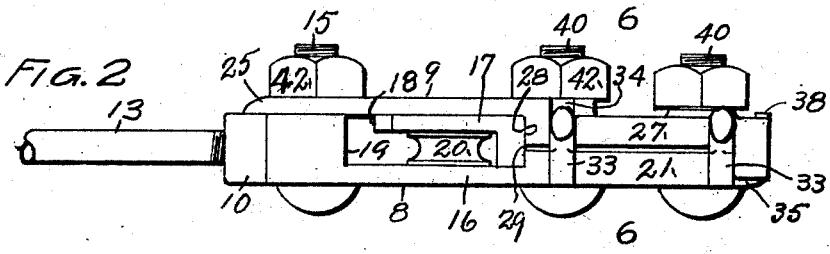
Fig. 2 is a side elevation of the same.
Figure 3:
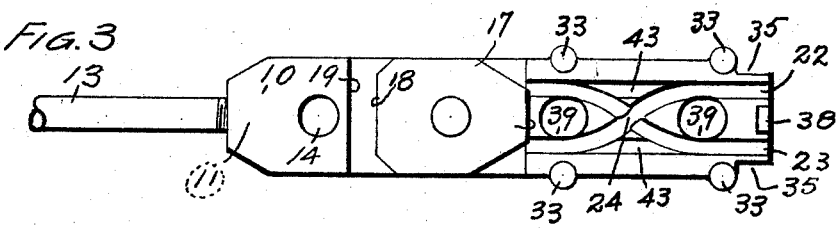
Fig. 3 is a top plan view of the lower section of my device.
Figure 4:
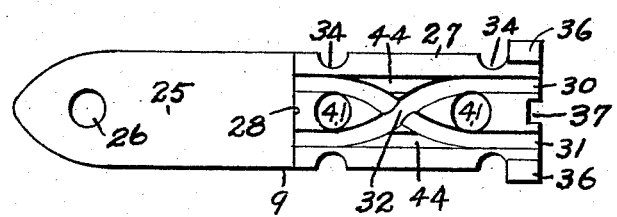
Fig. 4 is a plan view of the upper section of my device in reversed position.

In the construction of my device I employ a clamp composed of a lower section 8 and an upper section 9. The rear end 10 of the lower section is provided with a screw threaded bore 11 in which the screw threaded end 12 of a rod 13 is adapted to be secured. This rod 13 may be part of an earth anchor or it may be a rod secured to what is known in the trade as a dead man, or in fact it can be a rod attached to a building or secured in any other way to supporting a guy wire. It will be noted from Fig. 2 that the end 10 has a considerable thickness and is provided with an opening 14 through which a bolt 15 passes.

Adjacent the end 10 is a reduced portion which has an integrally formed L shaped portion 17. The end 18 of which however does not contact with the edge 19 of the portion 10. The purpose of this will be explained in detail later.

Pivotally mounted in the L shaped portion 17 is a sheave wheel 20. The forward portion 21 of the lower member 8 is thicker than the portion 16 and is provided with grooves 22 and 23. These grooves are sinuous and cross each other at the point indicated by the numeral 24. The groove 22, however, at its crossing point, or the point 24, being deeper than the groove 23. The upper member 9 is provided with a rear portion 25 which is provided with an opening 26 through which the bolt 15 passes. The forward end 27 of the member 25 is thickened and offset downwardly so as to form a shoulder 28, which shoulder 28 abuts the vertical portion 29 of the L shaped member 17 so that when the device is secured together the upper portion or cap 9 will absorb or relieve a certain amount of the strain from the lower member 8 which is set up when the cable or guy wire is tightened. The upper member or cap 9 is provided with sinuous grooves 30 and 31, which cross each other at a point indicated by the numeral 32. At this point of crossing the groove 30 is deepened similar to the deepening of the groove 22. The purpose of these deepenings will be explained in detail later.

The base portion 8 is also provided with upwardly extending lugs 33 which fit into recesses 34 formed in the cap or top member 9. The forward end of the base portion 8 is provided with cutaway portions 35 which receive tongues 36 formed integral with the top member 9, these tongues projecting downwardly. The top member is also provided with a recess 37 which receives a tongue 38. This tongue projects upwardly from the bottom member so that when the two members are superimposed they will be interlocked with each other and no side shifting and no forward or back movement can take place. These lugs or projections and recesses additionally assist the bolts in holding the members against any movement whatsoever.

The portion 21 of the lower member is provided with openings 39 which are substantially elliptical and which receive the ends of the bolts 15 and 40, it being understood, of course, that the opening 14 has its lower end also arranged elliptical. This is a common construction of these bolts and the elliptical portion thereof extends only a slight distance above the heads and is for the purpose of preventing the bolts from turning when the nuts 42 are applied.

The bottom member is also provided with grooves 43 and the top member with complementary grooves 44, which grooves are employed under certain conditions of securing the guy wire in place.

Figures 5, 6, 7:
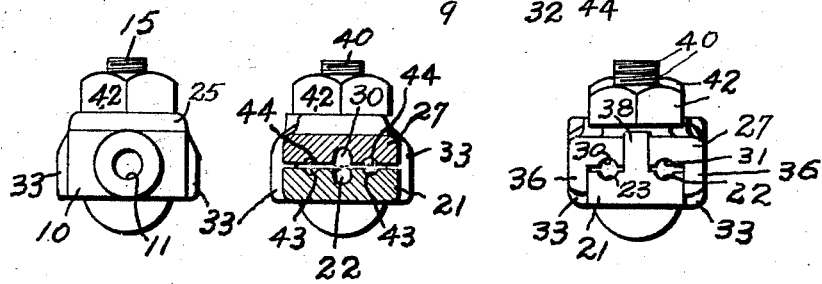
Fig. 5 is a rear view of my device as assembled.
Fig. 6 is a section taken on the line 6—6 of Fig. 2.
Fig. 7 is a front elevation of my device.

The preferred manner of placing the guy wire in position is as follows: the top member 9 is removed and the guy wire is bent upon itself so as to make it U shaped. This U shaped portion is then passed down between the end 18 of the L shaped member 17 and the shoulder 19 looping it around the sheave wheel 20. One portion of the wire is then passed through the groove 22. The opposite end, which is the loose end of the wire, is folded around through the groove 23, after which the top is placed in position and the bolts 15 and 40 inserted and lightly tightened down. This leaves the loose end of the wire lying in the groove 30 while the opposite portion of the wire lies in the groove 31 so that the wires or cables are superimposed on each other as illustrated in Fig. 6. A block and tackle is then placed on the loose end of the wire or cable and manipulated in the usual manner so as to draw the same taut and by reason of the pivotally mounted sheath wheel this can readily be done.

After a sufficient amount of tautness has been achieved the nuts 42 are tightened down on the bolts 15 and 40 whereas by my construction an undisturbed portion of the cable can be readily inserted, and when crossing the cable in the forward portion of the clamp an additional clamping and friction is set up after the nuts are properly tightened, which in itself gives an additional bite or holding surface on the cable, because at the crossing point the cable is kinked in two directions and in order to pull the cable out from the clamp, not alone will friction have to be overcome but also its resistance to kinking.

Having fully described my invention, what I claim is:—

1. A cable clamp comprising separate upper and lower members, means for detachably securing said members together, sinuous grooves crossing each other formed in each of said members, one of said grooves in each of said members being deeper at the point of crossing than the remaining grooves, and integral means carried by and projecting from the opposite member and engaging with each member for interlocking the same.

2. A cable clamp comprising upper and lower members, means for detachably securing said members together, sinuous grooves crossing each other formed in each of said members, one of said grooves in each of said members being deeper at the point of crossing than the remaining grooves, means carried by the lower member to the rear of said grooves for permitting a cable to be passed therearound, and means projecting from each member and engaging with the other member for interlocking the same.

3. A cable clamp comprising upper and lower members, means for detachably securing said members together, sinuous grooves crossing each other formed in each of said members, one of said grooves in each of said members being deeper at the point of crossing than the remaining grooves, a sheave wheel carried by the lower member to the rear of said grooves for permitting a cable to be passed therearound, and means projecting from each member and engaging with the other member for interlocking the same.

4. A cable clamp comprising upper and lower members, means for detachably securing said members together, sinuous grooves crossing each other formed in each of said members, one of said grooves in each of said members being deeper at the point of crossing than the remaining grooves, means carried by the lower member to the rear of said grooves and partially supported by the upper member for permitting a cable to be passed therearound, and means projecting from each member and engaging with the other member for interlocking the same.

5. A cable clamp comprising upper and lower members, means for detachably securing said members together, sinuous grooves crossing each other formed in each of said members, one of said grooves in each of said members being deeper at the point of crossing than the remaining grooves, a sheave wheel carried by the lower member to the rear of said grooves and partially supported by the upper member for permitting a cable to be passed therearound, and means projecting from each member and engaging with the other member for interlocking the same.

6. A cable clamp comprising upper and lower members, the lower member being adapted to be secured to the end of a screw threaded rod, means for detachably securing said members together, sinuous grooves crossing each other formed in each of said members, one of said grooves in each of said members being deeper at the point of crossing than the remaining grooves, a sheave wheel carried by the lower member to the rear of said grooves for permitting a cable to be passed therearound, and means projecting from each member and engaging with the other member for interlocking the same.

7. A cable clamp comprising upper and lower members, the lower member being adapted to be secured to the end of a screw threaded rod, means for detachably securing said members together, sinuous grooves crossing each other formed in each of said members, one of said grooves in each of said members being deeper at the point of crossing than the remaining grooves, means carried by the lower member to the rear of said grooves and partially supported by the upper member for permitting a cable to be passed therearound, and means projecting from each member and engaging with the other member for interlocking the same.

In testimony whereof I have affixed my signature.

JASPER BLACKBURN.